United States Patent
Rohrssen et al.

(10) Patent No.: US 10,865,745 B2
(45) Date of Patent: Dec. 15, 2020

(54) AIR INTAKE HEATER SYSTEM FOR A COMBUSTION ENGINE, METHOD FOR HEATING INTAKE AIR AND A VEHICLE COMPRISING SUCH A SYSTEM

(71) Applicant: Volvo Car Corporation, Gothenburg (SE)

(72) Inventors: Karsten Rohrssen, Grabo (SE); Peter Svensson, Frillesås (SE); Richard Sebestyen, Torslanda (SE); Håkan Persson, Torslanda (SE)

(73) Assignee: Volvo Car Corporation, Göteborg (SE)

( * ) Notice: Subject to any disclaimer, the term of this patent is extended or adjusted under 35 U.S.C. 154(b) by 22 days.

(21) Appl. No.: 16/379,850

(22) Filed: Apr. 10, 2019

(65) Prior Publication Data

US 2019/0323457 A1    Oct. 24, 2019

(30) Foreign Application Priority Data

Apr. 23, 2018  (EP) ..................... 18168741

(51) Int. Cl.
*F02M 26/42* (2016.01)
*F02M 26/05* (2016.01)
(Continued)

(52) U.S. Cl.
CPC ............ *F02M 26/42* (2016.02); *F02M 26/05* (2016.02); *F02M 26/06* (2016.02); *F02M 26/09* (2016.02);
(Continued)

(58) Field of Classification Search
CPC ........ F02M 26/42; F02M 26/05; F02M 26/06; F02M 26/09; F02M 26/35;
(Continued)

(56) References Cited

U.S. PATENT DOCUMENTS

| | | | |
|---|---|---|---|
| 2008/0060624 A1* | 3/2008 | Grandas | F02D 41/0082 123/568.12 |
| 2008/0190109 A1* | 8/2008 | Kardos | F02M 26/24 60/605.2 |

(Continued)

FOREIGN PATENT DOCUMENTS

| | | |
|---|---|---|
| DE | 102012219812 A1 | 4/2014 |
| DE | 112016003417 T5 | 4/2018 |

(Continued)

OTHER PUBLICATIONS

Sep. 27, 2018 European Search Report issue on International Application No. EP18168741.

*Primary Examiner* — Audrey K Bradley
*Assistant Examiner* — Edward Bushard
(74) *Attorney, Agent, or Firm* — Clements Bernard Walker; Christopher L. Bernard

(57) ABSTRACT

An air intake heater system for a combustion engine, comprising; a turbocharger, a high pressure EGR conduit, a low pressure EGR conduit, and an air intake conduit, where the system comprises a heat exchanger arranged upstream of the turbocharger, where the heat exchanger comprises a first flow channel connecting an air inlet to an inlet of the turbocharger and a second flow channel, where the second flow channel is part of the high pressure EGR conduit. The advantage of the invention is that intake air and low pressure EGR gas can be heated by the high pressure EGR gas, and that high pressure EGR gas can be cooled by intake air.

11 Claims, 3 Drawing Sheets

(51) Int. Cl.
*F02M 26/06* (2016.01)
*F02M 26/09* (2016.01)
*F02M 26/35* (2016.01)
*F02M 35/10* (2006.01)

(52) U.S. Cl.
CPC ...... *F02M 26/35* (2016.02); *F02M 35/10268* (2013.01)

(58) Field of Classification Search
CPC .......... F02M 35/10268; F02M 31/042; F02M 31/08; F02M 26/30; F02M 31/13; F02M 26/17; F02M 26/27; F02B 29/04; F02B 37/00
See application file for complete search history.

(56) References Cited

U.S. PATENT DOCUMENTS

2010/0332075 A1* 12/2010 Clarke ............ F02M 35/10393
701/33.4
2015/0260114 A1* 9/2015 Kanayama ......... F02D 41/0007
60/605.2

FOREIGN PATENT DOCUMENTS

JP    H0882256 A    3/1996
WO   2006123991 A1  11/2006

* cited by examiner

AIR INTAKE HEATER SYSTEM FOR A COMBUSTION ENGINE, METHOD FOR HEATING INTAKE AIR AND A VEHICLE COMPRISING SUCH A SYSTEM

CROSS-REFERENCE TO RELATED APPLICATION

The present patent application/patent claims the benefit of priority of co-pending European Patent Application No. 18168741.9, filed on Apr. 23, 2018, and entitled "AIR INTAKE HEATER SYSTEM FOR A COMBUSTION ENGINE, METHOD FOR HEATING INTAKE AIR AND A VEHICLE COMPRISING SUCH A SYSTEM," the contents of which are incorporated in full by reference herein for all purposes.

TECHNICAL FIELD

The present invention relates to a system for heating intake air of a vehicle, a method for heating intake air of a vehicle and a vehicle comprising such an intake air heating system.

BACKGROUND ART

Vehicles comprising an internal combustion engine are subjected to a plurality of different legislative requirements and regulations. Some of these requirements and regulations are directed to fuel consumption and exhaust emission. Different countries or markets may have different requirements, but most include a specific test cycle that is supposed to give an indication of the fuel consumption and exhaust emission of the vehicle. In another test, exhaust emissions are measured in order to control the efficiency of the exhaust gas aftertreatment system of the vehicle. One way of reducing exhaust gas emissions is to use exhaust gas recirculation (EGR), where part of the exhaust gas is recirculated to the air intake manifold of the combustion engine. The amount of recirculated exhaust gas is controlled e.g. in dependency of the load of the combustion engine.

The EGR gas can be either a high pressure (HP) EGR system where the exhaust gas is taken directly from the exhaust gas manifold, or can be a low pressure (LP) EGR system, where the exhaust gas is taken after the turbocharger and preferably after an exhaust gas aftertreatment device. An advantage of using HP EGR gas is that the gas is hot, which allows for a faster warm-up of the combustion engine. One disadvantage is that the HP EGR gas is not cleaned in an aftertreatment system and thus contains higher levels of pollutes. An advantage of using LP EGR is that the exhaust gas has been cleaned in an aftertreatment device such as a catalyst or particulate filter. A disadvantage of using LP EGR is humidity at lower ambient temperatures, which causes the humidity to condensate in the intake system of the vehicle, upstream of the turbocharger. At higher ambient temperatures, the humidity is not a problem.

The condensation of water, e.g. inside the air intake, is problematic as during this heat-up phase with LP EGR gas, water from the exhaust gases condensates and an un-controlled amount of water is present in the intake system, in intake coolers, and creates droplets that hit compressor blades of the turbocharger. The droplets may damage the compressor blades, and the water may freeze.

Due to the problem with water condensation, LP EGR gas is not used at low ambient temperatures, and HP EGR gas is used instead for exhaust gas recirculation. This is not of advantage, since the HP EGR gas is not as clean as the LP EGR gas. Further, the efficiency of an EGR system may be higher when using LP EGR. By using LP EGR, the $CO_2$ reduction may be improved. There is thus room for an improved EGR system of a vehicle.

SUMMARY

An object of the invention is therefore to provide an EGR system where the intake air is heated. A further object of the invention is to provide a vehicle that comprises such a system. A further object of the invention is to provide a method for heating intake air.

In an air intake heater system for a combustion engine, comprising; a turbocharger compressor having a compressor inlet, a compressor outlet, a turbine inlet and a turbine outlet; a high pressure EGR conduit having an inlet connected to the turbine inlet and an outlet connected to an intake manifold; a low pressure EGR conduit having an inlet connected to the turbine outlet and an outlet connected to the compressor inlet; and an air intake conduit having an inlet connected to the compressor outlet and an outlet connected to the intake manifold, the object of the invention is achieved in that the system comprises a heat exchanger arranged upstream of the compressor inlet, where the heat exchanger comprises a first flow channel connecting an air inlet to the compressor inlet and a second flow channel, where the second flow channel is part of the high pressure EGR conduit.

By this first embodiment of a system for heating intake air of a vehicle, the intake air is heated by a heat exchanger in which HP EGR gas is used as a heat source. At the same time, the HP EGR gas is cooled by the intake air. One advantage of this is that LP EGR gas can be used for recirculation to the air intake of the vehicle at a lower temperature, since the heating of the intake air will reduce condensation of water of the LP EGR gas. A further advantage is that the HP EGR gas is cooled by the intake air, which allows more HP EGR gas to be used to heat the engine at start of the vehicle. If the HP EGR gas is not cooled, it may exceed the allowed temperature at the intake manifold of the combustion engine. By using inlet air to cool the HP EGR gas, it is possible to replace a specific HP EGR gas cooler with the heat exchanger.

It should be understood that the term "connected" may refer to "fluidly connected", e.g. the inlet of the low pressure EGR conduit may be described as being fluidly connected to the turbine outlet.

The system is mainly adapted to be used at the start of a combustion engine and especially during low ambient temperatures. The system will allow for a faster warm-up time of the combustion engine and will further allow for a faster use of LP EGR for the recirculation. A faster warm-up time of the combustion engine will also give a faster warm-up time of the LP EGR gas, which will further minimize the problem of condensation of water from the LP EGR gas. The HP EGR conduit may be closed when the LP EGR conduit is opened, or the flow through the HP EGR conduit may be reduced when the LP EGR conduit is opened.

The heat exchanger is arranged at the air inlet of the vehicle, preferably downstream of the air filter. The heat exchanger is arranged relatively close to the compressor inlet of the turbocharger. The inlet of the LP EGR gas conduit is arranged upstream of the heat exchanger, which will allow the LP EGR gas to mix with heated inlet air. This will reduce the risk of condensation of water in the LP EGR gas. The heat exchanger comprises two flow channels, one flow channel for inlet air and one flow channel for HP EGR gas. The heat exchanger may be a double wall heat exchanger or may comprise a conduit wound around the first, inner flow channel. It is important that the heat exchanger does not restrict the flow through the heat exchanger.

In a further embodiment, the exhaust duct is provided with at least one exhaust gas aftertreatment device, e.g. a catalyst, a particulate filter or a NOx trap. The aftertreatment device is arranged downstream of the turbocharger and the inlet of the LP EGR conduit is arranged downstream of the aftertreatment device. The LP EGR gas will in this case be cleaner than the HP EGR gas, and will further be cooler.

In a method for heating intake air for a combustion engine comprising a turbocharger compressor in a vehicle, the steps of leading intake air from an air inlet through a heat exchanger to an inlet of the turbocharger compressor in a first flow channel, and leading high pressure EGR gas through the heat exchanger through a second flow channel to an intake manifold are comprised. In this way, the intake air is heated by the HP EGR gas, which will reduce condensation of water in the intake air. At the same time, the HP EGR gas will be cooled by the intake air.

In a further step, low pressure EGR gas is lead to the inlet of the turbocharger and is mixed with the intake air. Since the intake air is heated by the heat exchanger, the risk of condensation of water in the LP EGR gas is minimized.

In a further step, the flow of high pressure EGR gas to the intake manifold is reduced or stopped completely when the intake air has reached a predefined temperature. The temperature of the intake air is preferably measured before the turbine inlet. Intake air is here either only the inlet air or the mixture of inlet air and LP EGR gas. The use of LP EGR gas for the recirculation is advantageous in that the LP EGR gas is cleaner and cooler than the HP EGR gas. According to one example embodiment, the flow of high pressure EGR gas to the intake manifold is reduced or stopped completely when the intake air mixture has reached a predefined temperature, and the intake system has been preheated so that the enabled low-pressure exhaust gas recirculating gas mixture will not create condensation when re-circulated into the intake air system.

The vehicle may comprise a diesel combustion engine or a gasoline combustion engine comprising a turbocharger. The vehicle may be powered solely by the combustion engine, or may be a hybrid vehicle. The method is performed when the vehicle is started and the temperature of the combustion engine is low.

BRIEF DESCRIPTION OF DRAWINGS

The invention will be described in greater detail in the following, with reference to the attached drawings, in which.

DESCRIPTION OF EMBODIMENTS

The embodiments of the invention with further developments described in the following are to be regarded only as examples and are in no way to limit the scope of the protection provided by the patent claims.

Figure 1:
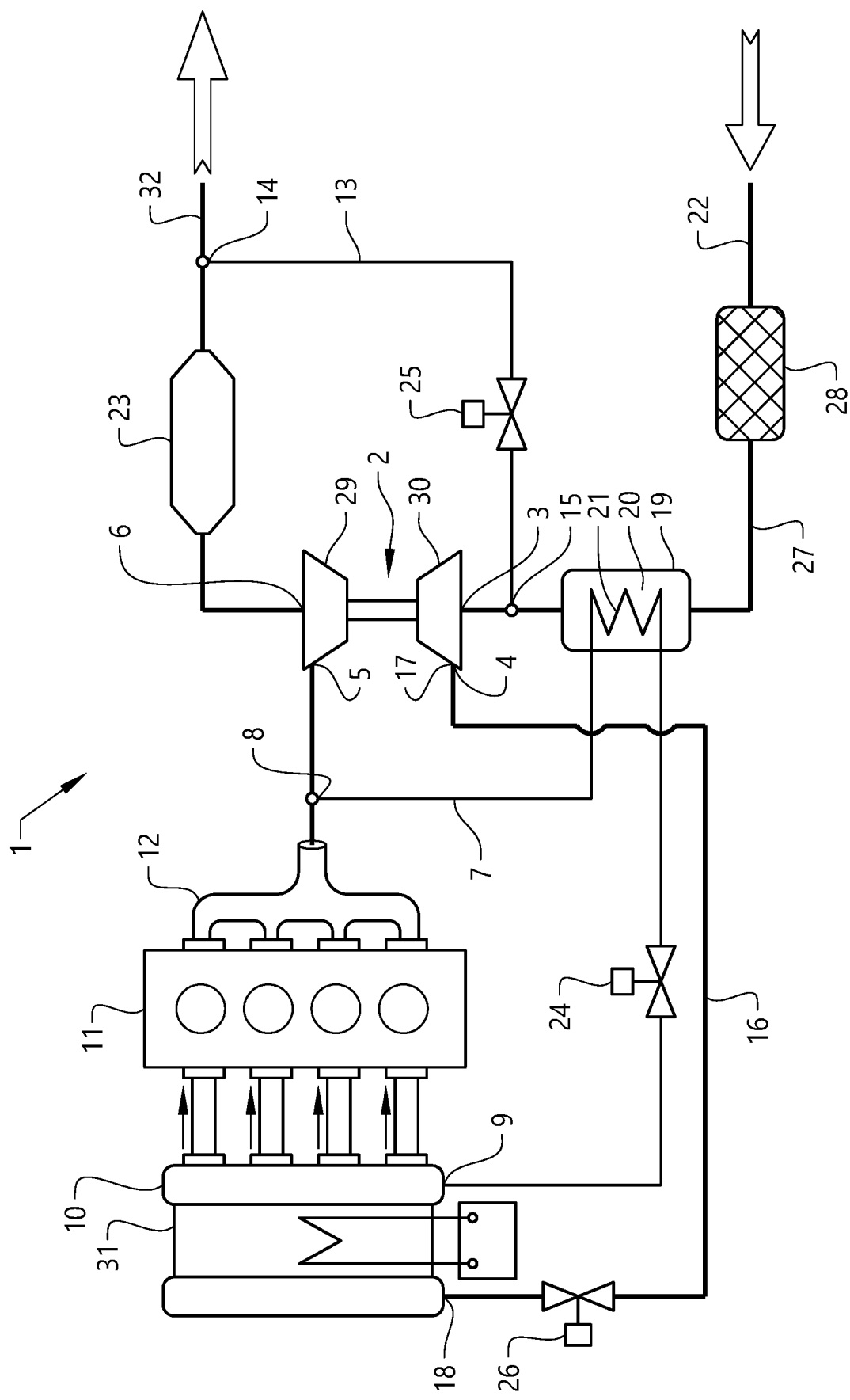
FIG. 1 shows a first embodiment of a system for heating intake air of a combustion engine according to the invention.
Figure 2:
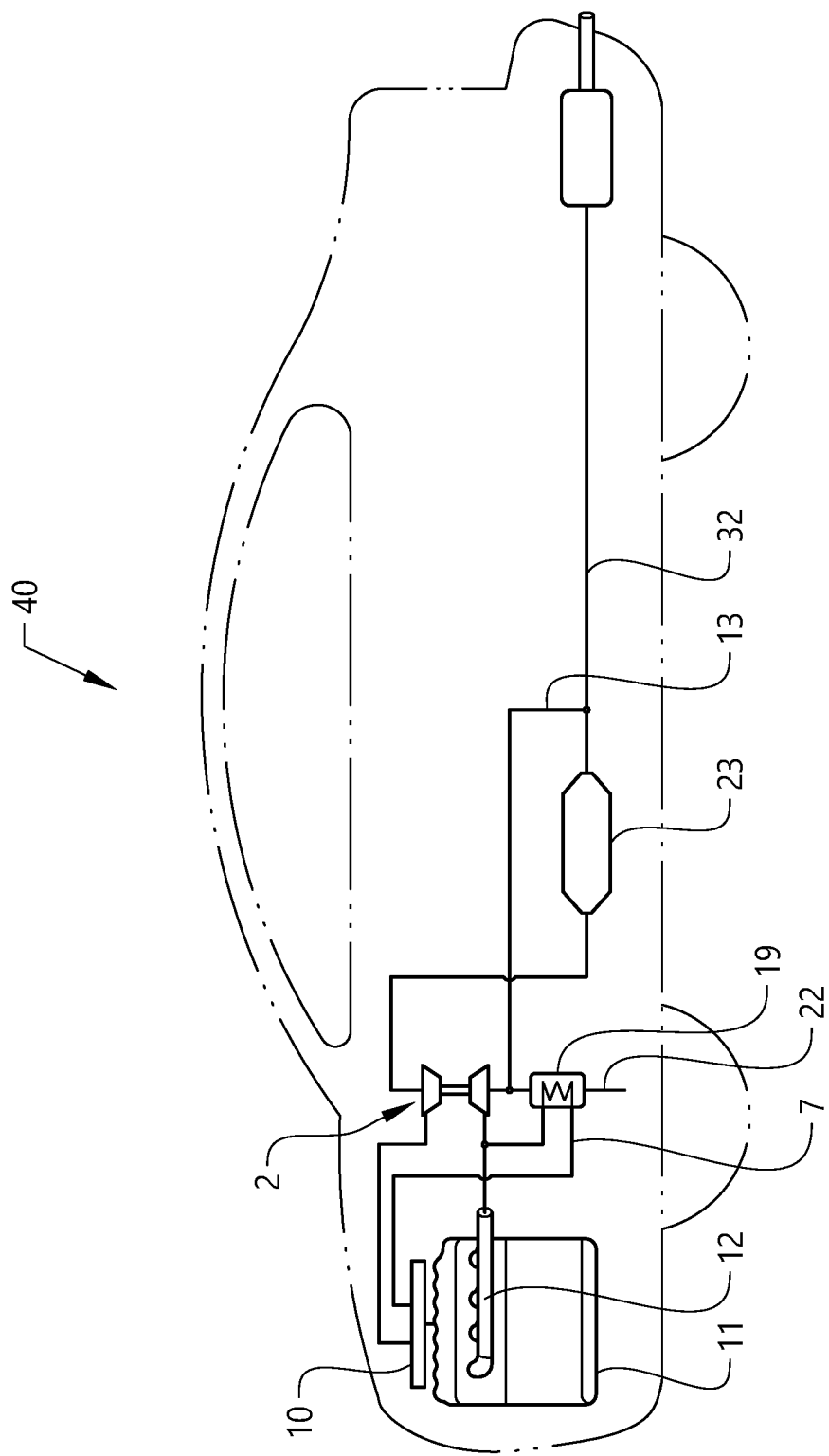
FIG. 2 shows a vehicle comprising a system for heating intake air of a combustion engine according to the invention.
Figure 3:
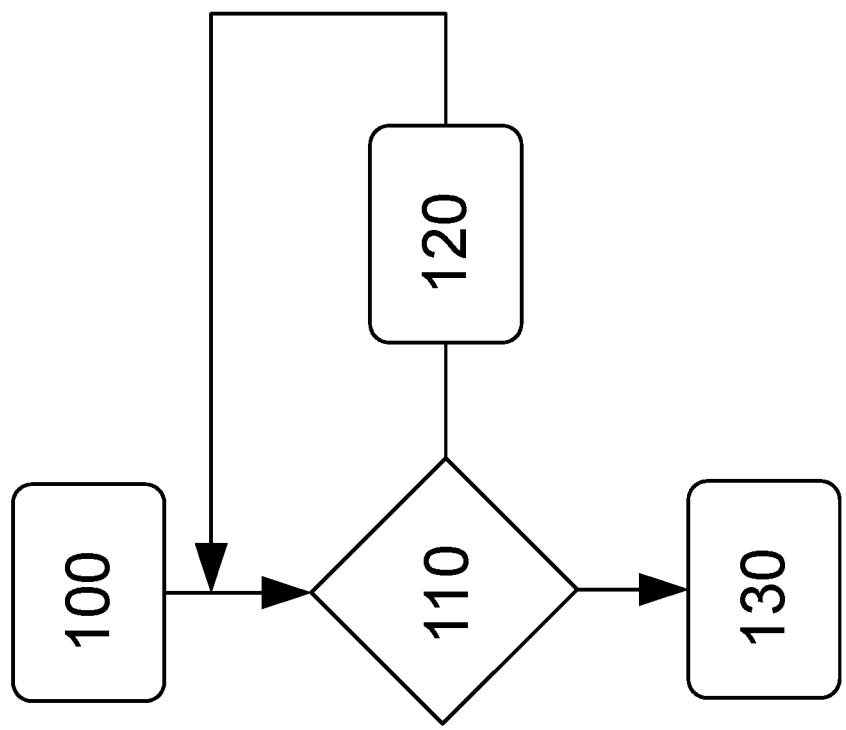
FIG. 3 shows a schematic flow chart of an inventive method for heating intake air of a combustion engine.

FIG. 1 shows a first embodiment of a system for heating intake air of a combustion engine, FIG. 2 shows a vehicle comprising such system for heating intake air of a combustion engine, and FIG. 3 shows a schematic flow chart of an inventive method for heating intake air of a combustion engine.

The air intake heater system 1 is arranged at a combustion engine in a vehicle. The combustion engine may be either a diesel engine or a combustion engine running on petrol, natural gas or the like. The combustion engine may be a spark ignited combustion engine or a sparkplug controlled compression engine. The combustion engine 11 is provided with an air intake manifold 10 adapted to receive and distribute intake air to the inlet of the combustion engine. The combustion engine is further provided with an exhaust gas manifold 12 adapted to collect and exhaust the combustion gases of the combustion engine. The output of the exhaust gas manifold is connected to the turbine inlet 5 of a turbocharger 2. The turbocharger 2 is adapted to improve the engine power output and to reduce emissions. The turbocharger 2 comprises an exhaust gas driven turbine 29 which drives a compressor 30 mounted on the same shaft. The turbocharger is provided with a turbine inlet 5, a turbine outlet 6, a compressor inlet 3 and a compressor outlet 4. The compressor may also be a mechanically or electrically powered compressor adapted to compress the intake air.

In the shown example, the intake air for the internal combustion engine 11 enters through an air inlet 22 and passes through an air filter 28 via an air inlet duct 27. The air passes through a heat exchanger 19 before being passed through the compressor inlet 3 to the compressor 30 of the turbocharger 2. The compressed air leaves the compressor through the compressor outlet 4 and passes through an air intake duct 16 having an inlet 17 and an outlet 18. The air intake duct 16 may comprise a throttle 26 configured to vary the mass flow of air into the internal combustion engine. The outlet 18 is connected to the air intake manifold 10. The air intake manifold 10 may be provided with an air cooler 31 adapted to cool the intake air. The air cooler 31 may further increase the density of the air entering the internal combustion engine, thereby improving its performance.

The exhaust gases leaves the internal combustion engine 11 through the exhaust gas manifold 12 to the turbine 29 of the turbocharger 2 through the turbine inlet 5, and exits through the turbine outlet 6 to an exhaust duct 32. One or more exhaust aftertreatment devices 23 may be provided downstream of the turbocharger 2, e.g. to reduce emissions from the engine exhaust. An exhaust aftertreatment device may comprise one or more of an oxidation catalyst (SCR), e.g. a diesel oxidation catalyst, a particulate filter (DPF), e.g. a diesel particulate filter, or a NOx adsorber, e.g. a lean NOx trap (LNT).

The combustion engine is further provide with a high pressure exhaust gas recirculation (HP EGR) system comprising a HP EGR conduit 7 having an inlet 8 connected to the turbine inlet 5, or to an outlet of the exhaust gas manifold 12 (or to a point downstream of the exhaust gas manifold 12 and upstream of the turbine inlet 5), and an outlet 9 connected to the air intake manifold 10. The HP EGR is configured to selectively recirculate exhaust gases directly from the internal combustion engine back into the internal combustion engine. The HP EGR conduit 7 is provided with a HP EGR valve 24 adapted to control the amount of recirculated exhaust gas.

The combustion engine further comprises a low pressure exhaust gas recirculation (LP EGR) system comprising a LP EGR conduit 13 having an inlet 14 connected at the turbine outlet 6 side (in FIG. 1 the inlet 14 is arranged downstream of the one or more exhaust aftertreatment devices 23) and an outlet 15 connected to the compressor inlet 3 (or to point downstream of the heat exchanger 19, and upstream of the compressor inlet 3). The LP EGR is configured to selectively recirculate exhaust gases from the internal combustion engine back into the internal combustion engine. The LP EGR conduit 13 is provided with a LP EGR valve 25 adapted to control the amount of recirculated exhaust gas.

The LP EGR is connected to the exhaust gas system at the downstream side of the turbocharger 2 such that exhaust gases leaving the turbine may be recirculated into the compressor inlet 3, and the inlet 14 of the LP EGR conduit may be connected to the exhaust system either upstream or downstream of the exhaust aftertreatment device 23. It is of advantage to connect the LP EGR conduit downstream of the exhaust aftertreatment device since the exhaust gas will be cleaner here. Further, the exhaust gas will have a lower pressure after the turbocharger and also a lower temperature, compared with the exhaust gas upstream of the turbocharger.

The air intake heater system 1 is provided with a heat exchanger 19 comprising a first flow channel 20 and a second flow channel 21. The heat exchanger is arranged in the air inlet duct 27, upstream of the compressor inlet 3 and upstream of the outlet 15 of the LP EGR conduit 13. The first flow channel 20 is part of the air inlet duct 27 and leads air from the air inlet 22 to the compressor inlet 3. The area of the first flow channel is preferably the same as the air inlet duct such that the heat exchanger does not restrict the air flow through the air inlet duct. The second flow channel 21 is part of the HP EGR conduit 16 and is adapted to transfer heat from the HP EGR gas to the inlet air. One purpose is to heat the inlet air and another purpose is to cool the HP EGR gas flow. By heating the inlet air, the LP EGR gas will mix with a warmer air which will reduce the risk of condensation. At the same time, the HP EGR gas is cooled, which means that a dedicated HP EGR cooler is not necessary.

The second flow channel 21 may be designed in different ways. In one example, the heat exchanger is provided with a double wall, where the HP EGR gas runs in an outer channel surrounding the inner flow channel. In another example, the HP EGR gas runs in a conduit wound around the first flow channel. Since the HP EGR gas is uncleaned, it is of advantage to let the second flow channel be relatively large such that the flow channel does not clog up.

The shown system comprises two EGR circuits. Exhaust gas recirculation is used to control emissions from the combustion engine. By recirculating exhaust gas to the air intake manifold, excessive carbonates and pollutes can be reduced. The EGR can be either direct as a HP EGR, i.e. exhaust gases are taken directly from the engine exhaust manifold, or the EGR can be taken further downstream of the exhaust system as a LP EGR. The HP EGR provides hotter exhaust gas to the intake manifold, but the exhaust gas also includes higher levels of pollutes, since the exhaust gas has not passed a catalyst, a particulate filter, or other exhaust gas aftertreatment devices. The LP EGR is cleaner since the exhaust gas has passed aftertreatment devices, and is cooler and has a lower pressure.

HP EGR, with hot, high pressure none cleaned gas is beneficial for heat-up of the combustion system, at cold conditions and when starting the vehicle. LP EGR, with cooler, cleaned gas is beneficial for optimal conversion and fuel consumption when driving, once the combustion and exhaust aftertreatment system has been warmed up. A disadvantage of HP EGR is that none cleaned gas is challenging from a quality point of view due to issues caused by clogging of soot deposits. At the same time, the HP EGR must be cooled down in order to fulfil engine intake manifold temperature boundaries. A disadvantage of LP EGR is that cooler cleaned gas contains more humidity that may condensate at the air inlet. Droplets of water may then enter the compressor and may damage the compressor wings rotating with a high speed. At cold temperatures, the water may also freeze. It is of advantage to use LP EGR as much as possible to reduce $CO_2$. At cold ambient conditions, the use of LP EGR is limited due to risk of condensation and ice.

In the inventive system, in order to allow increased usage of LP EGR, the HP EGR gas is used to heat the inlet air. This will decrease the risk of condensation of LP EGR gas. In a traditional system, the LP EGR and the fresh inlet air system is not pre-heated, and the system is only warmed up by LP EGR gas, once the LP EGR piping is opened for recirculation of exhaust gases. During the heat-up phase, water from the exhaust gas condensate and an un-controlled amount of water is present in the air intake system and creates droplets that hit the compressor blades.

When the vehicle is started and the temperature of the combustion engine is low, the HP EGR conduit is used to lead hot combustion gas to the air intake manifold. The hot gas will help to heat the combustion engine such that the combustion engine will reach its working temperature as fast as possible. At the same time, the inlet air is heated by the heat exchanger 19. When the combustion engine and the exhaust gas system, e.g. the aftertreatment devices, are warming up, the amount of HP EGR gas can be decreased by closing the HP EGR valve 24 somewhat and at the same time opening the LP EGR valve 25 somewhat in order to use LP EGR gas for the exhaust gas recirculation. The LP EGR gas is warmed by the heat exchanger 19, thereby reducing the risk of condensation of water. When the combustion engine heats up more, the relation between HP EGR gas and LP EGR gas can be further adjusted, such that more LP EGR gas is used. When the exhaust gas system has reached its nominal working temperature, the LP EGR gas will be warm and can be recirculated without the need of additional warming. It may still be of advantage to use some HP EGR for the exhaust gas recirculation, e.g. in order to reduce NOx impulses at transient engine performance. The HP EGR valve can now be controlled to add the desired amount of HP EGR gas, or may be completely closed, depending on the actual driving conditions. In normal driving conditions, it is of advantage to use as much LP EGR gas as possible.

The vehicle 40 shown in FIG. 2 comprises a combustion engine 11, which may be a diesel engine, a gasoline engine or an engine using liquefied natural gas or compressed natural gas, and the air intake heating system of FIG. 1 (which is not described here again, and of which only some components are shown). The vehicle may be powered solely by the combustion engine, or may be a hybrid vehicle. The combustion engine comprises an air intake heater system 1 arranged at the air inlet of the vehicle.

FIG. 3 shows a schematic flow chart of a method for heating intake air of a vehicle 40. The method is performed at start-up of the vehicle, at the start of a driving regime. During start-up of the engine, different parameters of the vehicle can be monitored in order to determine the status of various components of the vehicle. The working temperature of the combustion engine is one important parameter. The temperature of e.g. a catalyst is also important, and the status of a particulate filter may be important. The parameters may be measured or may be estimated from other measurements of the vehicle.

The method steps are preferably performed by a computer program and a computer program product contained and run in the electronic control unit of the vehicle.

In step 100, the combustion engine is started. The HP EGR valve 24 is open, which leads hot exhaust gas to the intake manifold of the combustion engine. The LP EGR valve 25 is closed.

In step 110, the combustion engine is running. The status of the combustion engine is determined in order to decide when the working temperature of the combustion engine is reached. This can be done e.g. by measuring temperature or load parameters of the combustion engine. This is performed by an electronic control unit of the vehicle. It is also possible to determine the status of the aftertreatment device.

In step 120, it is determined that the combustion engine is warming up and that the working temperature of the combustion engine is not reached. The HP EGR valve is thus closed somewhat, restricting the amount of HP EGR gas to the intake manifold. At the same time, the LP EGR valve is opened somewhat, adding LP EGR gas to the intake manifold. Depending on the determined status of the combustion engine, the amount of HP EGR and LP EGR is balanced, e.g. by using a predefined table.

In step 130, it is determined that the working temperature of the combustion engine is reached. The amount of HP EGR gas and LP EGR gas is controlled by regulating the HP EGR valve and the LP EGR valve. The HP EGR valve may be closed partly or completely, the LP EGR valve is more or less open and the balance between the amount of LP EGR gas and HP EGR gas is regulated depending on the load conditions of the combustion engine.

The invention is not to be regarded as being limited to the embodiments described above, a number of additional variants and modifications being possible within the scope of the subsequent patent claims.

The invention claimed is:

1. An air intake heater system for a combustion engine, comprising: a turbocharger having a compressor inlet, a compressor outlet, a turbine inlet and a turbine outlet; a high pressure EGR conduit having an inlet connected to the turbine inlet and an outlet connected to an intake manifold; a low pressure EGR conduit having an inlet connected to the turbine outlet and an outlet connected to the compressor inlet; and an air intake conduit having an inlet connected to the compressor outlet and an outlet connected to the intake manifold, wherein the system comprises a heat exchanger arranged upstream of the compressor inlet, wherein the heat exchanger comprises a first flow channel connecting an air inlet to the compressor inlet and a second flow channel, wherein the second flow channel is part of the high pressure EGR conduit, and wherein the outlet of the low pressure EGR conduit is arranged downstream of the heat exchanger.

2. The system according to claim 1, wherein the inlet of the low pressure EGR conduit is arranged downstream of an aftertreatment device arranged downstream of the combustion engine.

3. The system according to claim 1, wherein the low pressure EGR conduit is provided with a valve that can be controlled continuously between an open and a closed state.

4. The system according to claim 1, wherein the high pressure EGR conduit is provided with a valve that can be controlled continuously between an open and a closed state.

5. The system according to claim 1, wherein the air intake conduit is provided with a valve that can be controlled continuously between an open and a closed state.

6. A vehicle comprising a system according to claim 1.

7. The vehicle according to claim 6, wherein the vehicle further comprises at least one exhaust aftertreatment device arranged downstream of the turbocharger.

8. The vehicle according to claim 7, wherein the exhaust aftertreatment device is a catalytic converter.

9. A method for heating intake air in a combustion engine comprising a turbocharger, comprising the following steps:
   leading inlet air from an air inlet through a heat exchanger to an inlet of the turbocharger in a first flow channel,
   leading high pressure EGR gas through the heat exchanger through a second flow channel to an intake manifold, and
   recirculating low pressure EGR gas from an outlet of the turbocharger to the inlet of the turbocharger downstream of the heat exchanger.

10. The method according to claim 9, wherein the method comprises the step of leading low pressure EGR gas to the inlet of the turbocharger.

11. The method according to claim 9, wherein the method comprises the step of closing the flow of high pressure EGR gas to the intake manifold partly or completely when the intake air mixture has reached a predefined temperature.

* * * * *